(12) United States Patent
Motowaki (10) Patent No.: US 10,160,073 B2
(45) Date of Patent: Dec. 25, 2018

(54) SCREW-FASTENING ROBOT SYSTEM

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 119 days.

(21) Appl. No.: 15/487,750

(22) Filed: Apr. 14, 2017

(65) Prior Publication Data

US 2017/0304968 A1 Oct. 26, 2017

(30) Foreign Application Priority Data

Apr. 21, 2016 (JP) .................. 2016-085204

(51) Int. Cl.
| | |
|---|---|
| *B23P 19/06* | (2006.01) |
| *B25J 15/00* | (2006.01) |
| *B25B 23/06* | (2006.01) |
| *B25J 11/00* | (2006.01) |
| *B23P 19/00* | (2006.01) |

(52) U.S. Cl.
CPC ............. *B23P 19/06* (2013.01); *B23P 19/001* (2013.01); *B25B 23/06* (2013.01); *B25J 11/005* (2013.01); *B25J 15/0019* (2013.01); *Y10S 901/41* (2013.01)

(58) Field of Classification Search
CPC ........ B23P 19/06; B23P 19/001; B25B 23/06; B25J 11/005; B25J 15/0019; Y10S 901/41
USPC ................................. 81/57.37, 434
See application file for complete search history.

(56) References Cited

U.S. PATENT DOCUMENTS

| | | | |
|---|---|---|---|
| 4,773,156 A | 9/1988 | Kurita | |
| 5,154,316 A * | 10/1992 | Holcomb | B23P 19/001 198/760 |
| 5,398,616 A | 3/1995 | Eidemanis et al. | |
| 9,370,848 B2 * | 6/2016 | Harada | B23P 19/06 |
| 9,579,756 B2 * | 2/2017 | Iwai | B23P 19/06 |

(Continued)

FOREIGN PATENT DOCUMENTS

| | | |
|---|---|---|
| JP | 62152630 | 7/1987 |
| JP | 05-57537 | 9/1993 |
| JP | 07-214432 | 8/1995 |

(Continued)

OTHER PUBLICATIONS

Japanese Office Action dated Mar. 20, 2018, for Japanese Patent Application No. 2016-085204.

(Continued)

*Primary Examiner* — Hadi Shakeri
(74) *Attorney, Agent, or Firm* — Karceski IP Law, PLLC (57) ABSTRACT

A robot screw-fastening device includes a nut runner that is attached to a distal end of an arm of a robot to fasten screws one by one. A screw magazine accommodates a plurality of screws to be fed to the nut runner. A magazine inserting-extracting mechanism inserts and extracts a screw retrieving position of the screw magazine to and from below the nut runner. The screw magazine includes a flat support surface with a slit-like opening that contacts with a bearing surface of each of the screws so as to support the screws in a hanging state. The slit-like opening allows an underhead section of each screw to extend therethrough so that the plurality of screws are arranged parallel to each other in a single row.

3 Claims, 9 Drawing Sheets

(56) References Cited

U.S. PATENT DOCUMENTS

2004/0052629 A1    3/2004  Shibata

FOREIGN PATENT DOCUMENTS

| JP | 08-071866   | 3/1996  |
| JP | 2003-311555 | 11/2003 |
| JP | 2011245581  | 12/2011 |
| JP | 2014-168833 | 9/2014  |

OTHER PUBLICATIONS

Japanese Search Report by a Registered Searching Organization for Japanese Patent Application No. 2016-085204 dated Feb. 26, 2018.
Office Action for Japanese Patent Application No. 2016-085204 dated Mar. 20, 2018.

* cited by examiner

SCREW-FASTENING ROBOT SYSTEM

CROSS-REFERENCE TO RELATED APPLICATIONS

This application is based on and claims priority to Japanese Patent Application No. 2016-085204, filed on Apr. 21, 2016, the entire contents of which are incorporated herein by reference.

FIELD OF THE INVENTION

The present invention relates to robot screw-fastening devices and screw-fastening robot systems.

BACKGROUND OF THE INVENTION

A known screw fastening device in the related art is provided with a screw feeding mechanism on a shaft of a driver bit (for example, see Japanese Unexamined Patent Application, Publication No. 2011-245581).

This screw fastening device includes a screw chute having a slide surface that is inclined in the horizontal direction below the driver bit moved vertically along the fixed shaft and on which the bearing surface of a screw slides. Screws are fed to the screw chute from a screw cassette connected to the upstream side of the screw chute.

SUMMARY OF THE INVENTION

The present invention provides the following solutions.

An aspect of the present invention provides a robot screw-fastening device including a nut runner that is attached to a distal end of an arm of a robot and that fastens screws one by one, a screw magazine that accommodates a plurality of the screws to be fed to the nut runner, and a magazine inserting-extracting mechanism that inserts and extracts a screw retrieving position of the screw magazine to and from below the nut runner. The screw magazine includes a flat support surface that has a slit-like opening and that comes into contact with a bearing surface of each of the screws so as to support the screws in a hanging state. The slit-like opening allows an underhead section of each screw to extend therethrough in a state where the plurality of screws are arranged parallel to each other in a single row.

Another aspect of the present invention provides a screw-fastening robot system including a robot, the aforementioned robot screw-fastening device that is attached to the distal end of the arm of the robot, and a controller that controls the robot and the robot screw-fastening device.

DESCRIPTION OF EMBODIMENTS

A robot screw-fastening device 4 and a screw-fastening robot system 1 according to an embodiment of the present invention will be described below with reference to the drawings.

Figure 1:
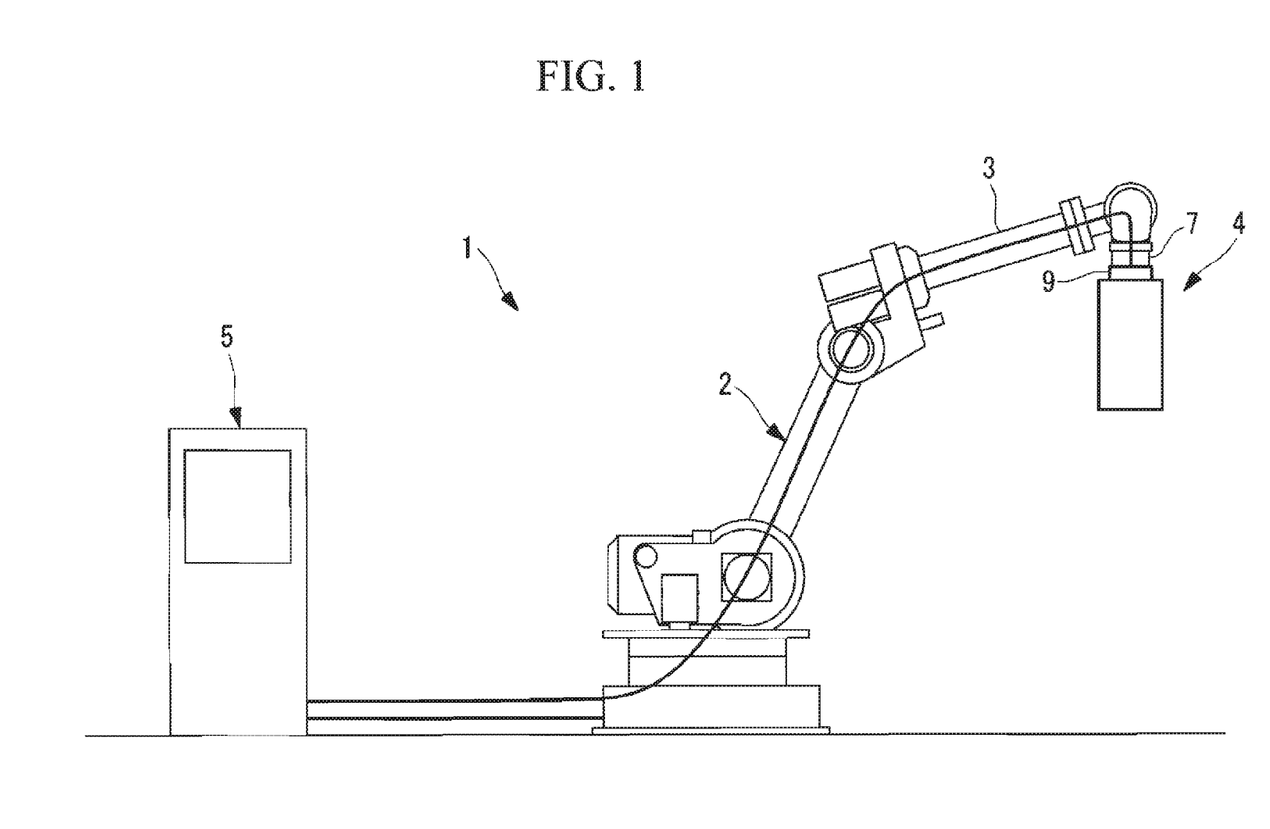
FIG. 1 illustrates the overall configuration of a screw-fastening robot system according to an embodiment of the present invention.

As shown in FIG. 1, the screw-fastening robot system 1 according to this embodiment includes a robot 2, the robot screw-fastening device 4 attached to the distal end of an arm 3 of the robot 2, and a controller 5 that controls the robot 2 and the robot screw-fastening device 4.

The robot 2 is, for example, a vertical articulated robot and is capable of freely changing the position and orientation of the robot screw-fastening device 4 attached to the distal end of the arm 3. Thus, the robot 2 can move the robot screw-fastening device 4 between a position where a screw 6 is to be loaded by a screw feeder (not shown) and an object to be fastened.

Figure 2:
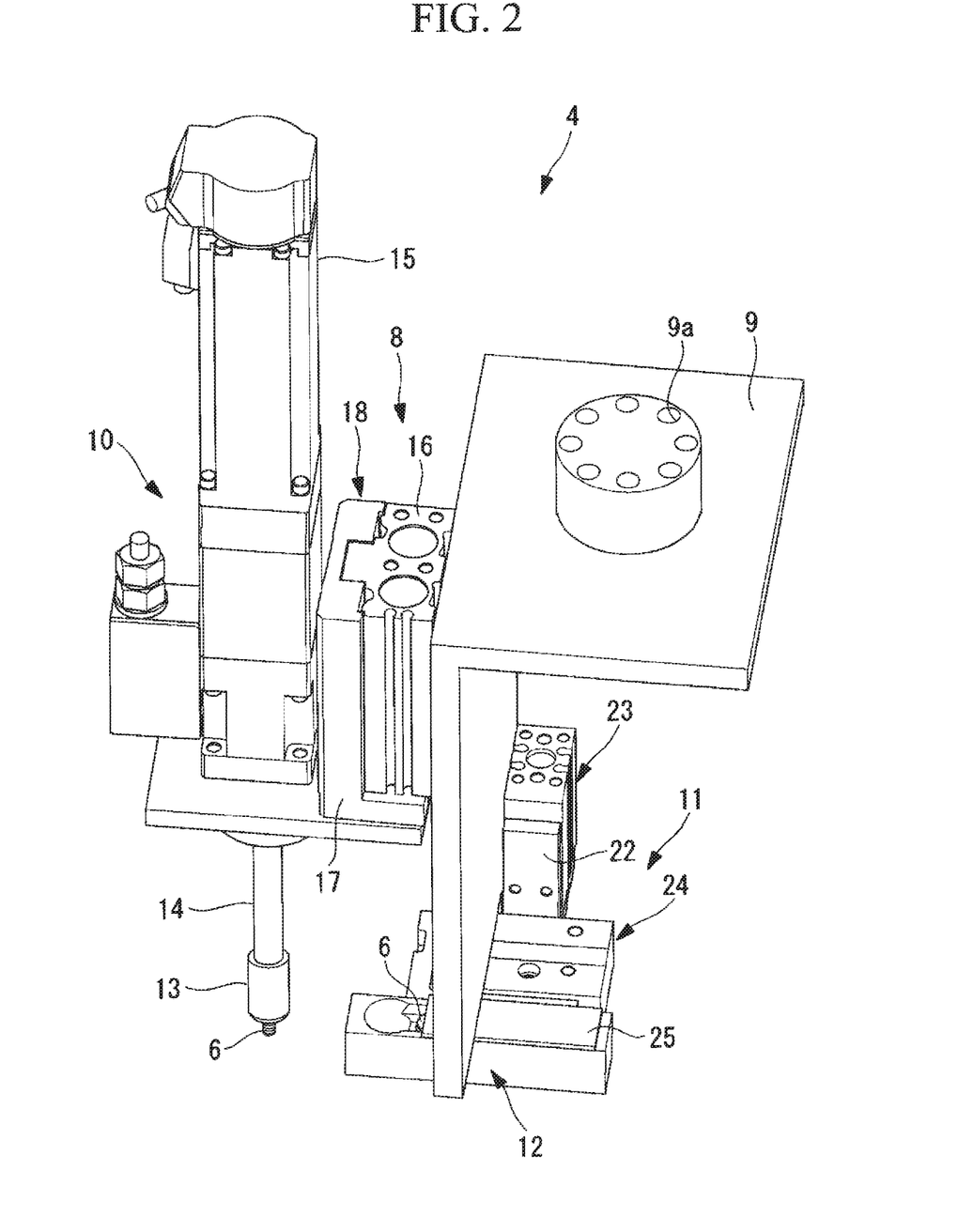
FIG. 2 is a perspective view illustrating a robot screw-fastening device, according to an embodiment of the present invention, included in the screw-fastening robot system in FIG. 1.

As shown in FIG. 2, the robot screw-fastening device 4 according to this embodiment includes a bracket 9 having attachment holes 9a to be attached to an attachment flange 7 at the distal end of the arm 3, a nut runner 10 fixed to the bracket 9, an advancing-receding mechanism 8 that causes the nut runner 10 to advance and recede in the axial direction thereof, a screw magazine 12 in which a plurality of screws 6 are loadable, and a magazine moving mechanism (magazine inserting-extracting mechanism) 11 that causes the screw magazine 12 to move along the axis of the nut runner 10 and in the direction orthogonal to the axis.

The nut runner 10 includes a substantially-cylindrical nut-runner suction unit 13 the distal end of which engages with a head 6a of the screw 6 so as to rotate it about the axis thereof, a round-rod-shaped shaft 14 serially connected to the nut-runner suction unit 13, and a rotational driving unit 15 that causes the shaft 14 to rotate about the axis thereof.

The advancing-receding mechanism 8 includes an air cylinder 18 in which a cylinder 16 is fixed to the bracket 9 and in which a piston 17 is fixed to the nut runner 10. The air cylinder 18 operates so as to cause the piston 17 to move relative to the cylinder 16 in the axial direction of the nut runner 10, thereby causing the nut runner 10 to advance and recede in the axial direction.

Figure 3:
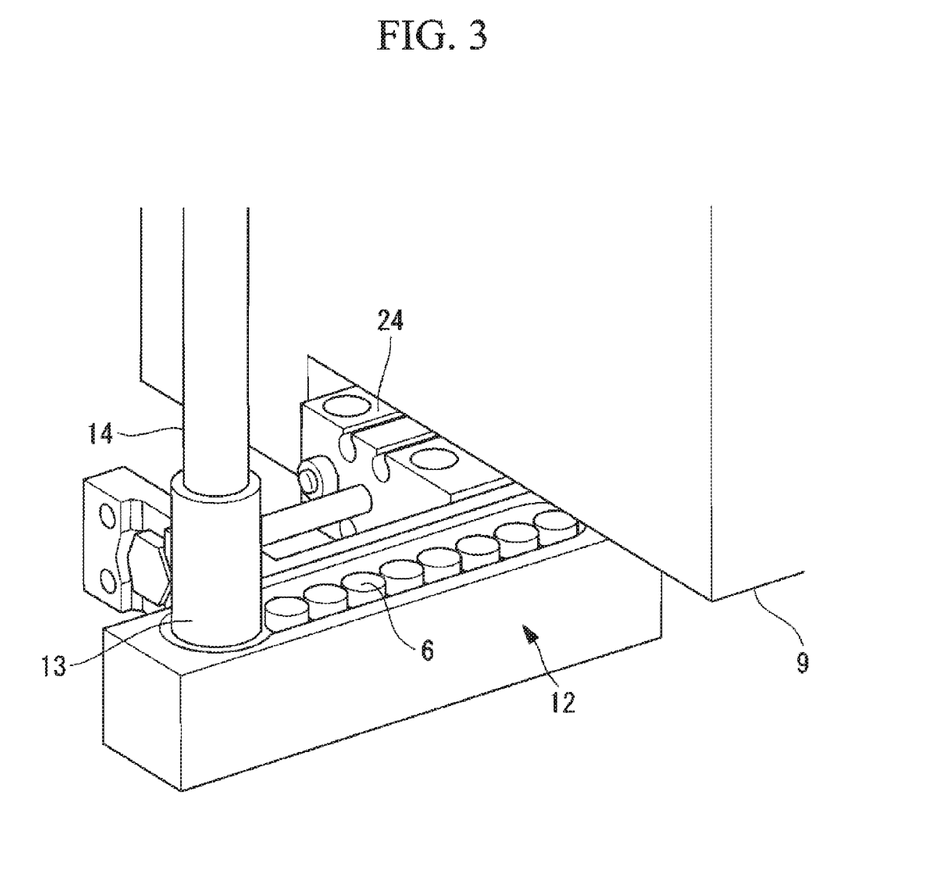
FIG. 3 is a partially-enlarged perspective view illustrating a screw magazine and a nut-runner suction unit of the robot screw-fastening device in FIG. 2.
Figure 4:
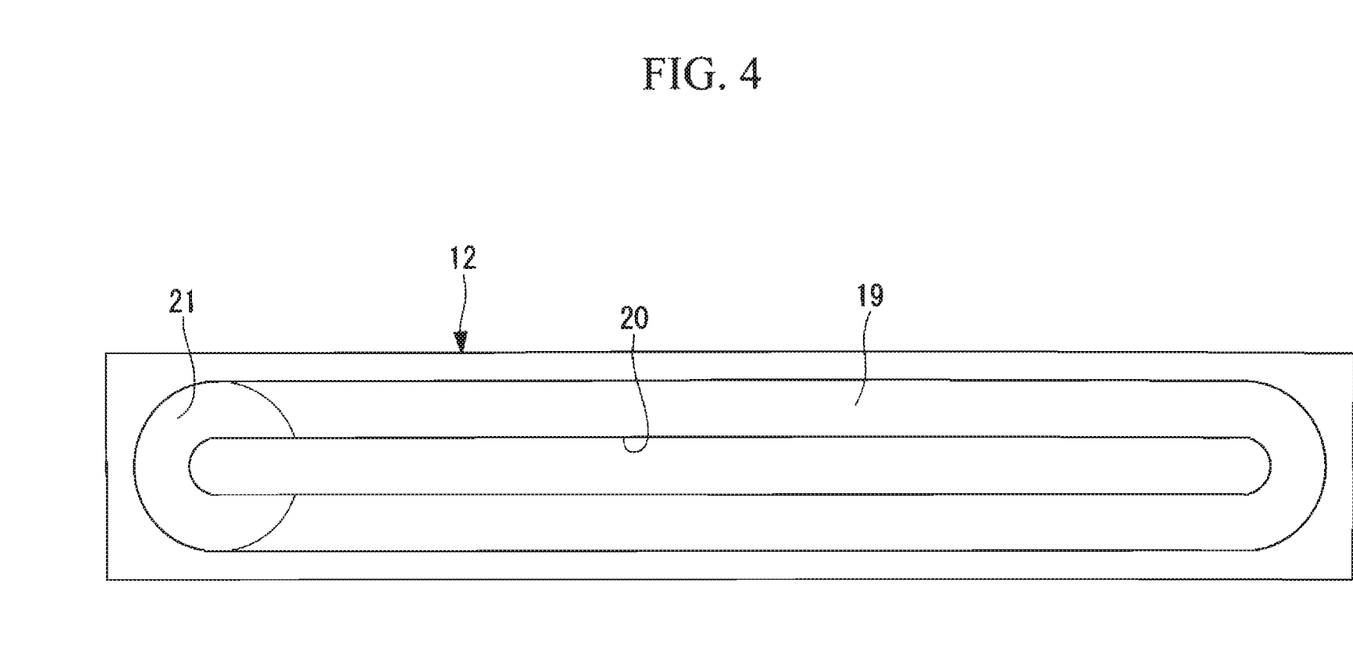
FIG. 4 is a plan view illustrating the screw magazine of the robot screw-fastening device in FIG. 2.
Figure 5:
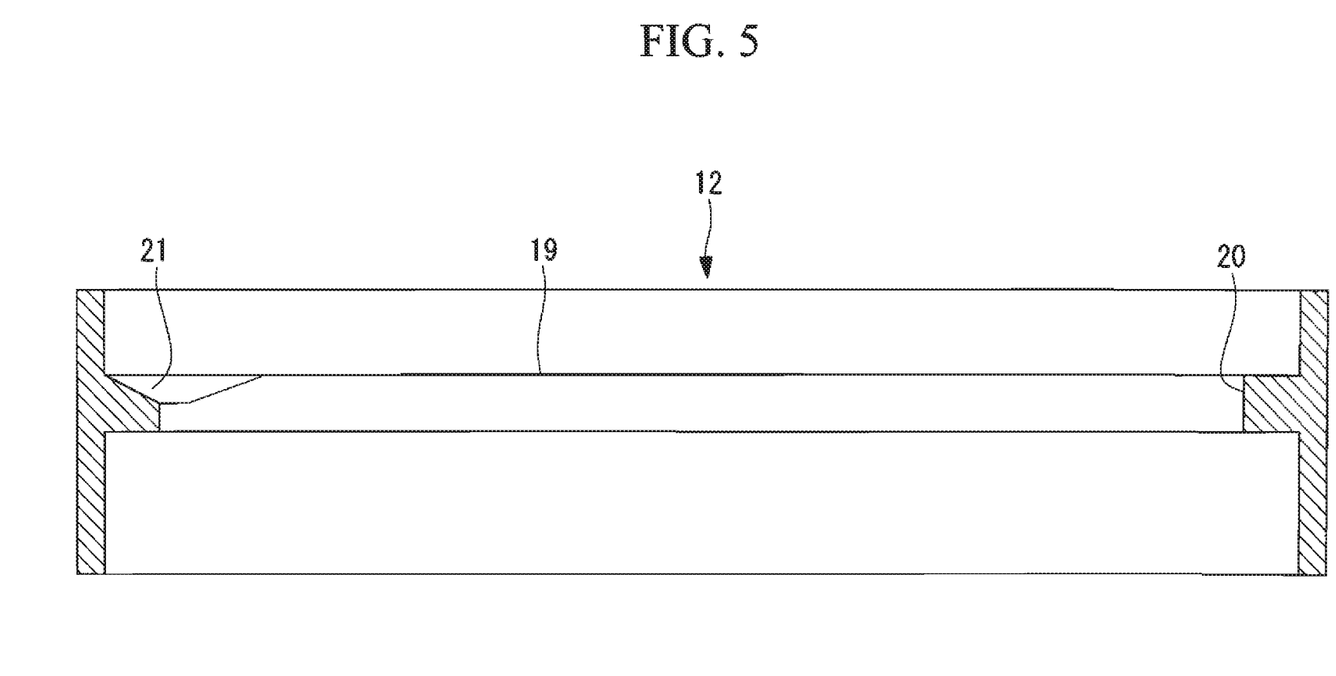
FIG. 5 is a vertical sectional view of the screw magazine in FIG. 4.
Figure 6:
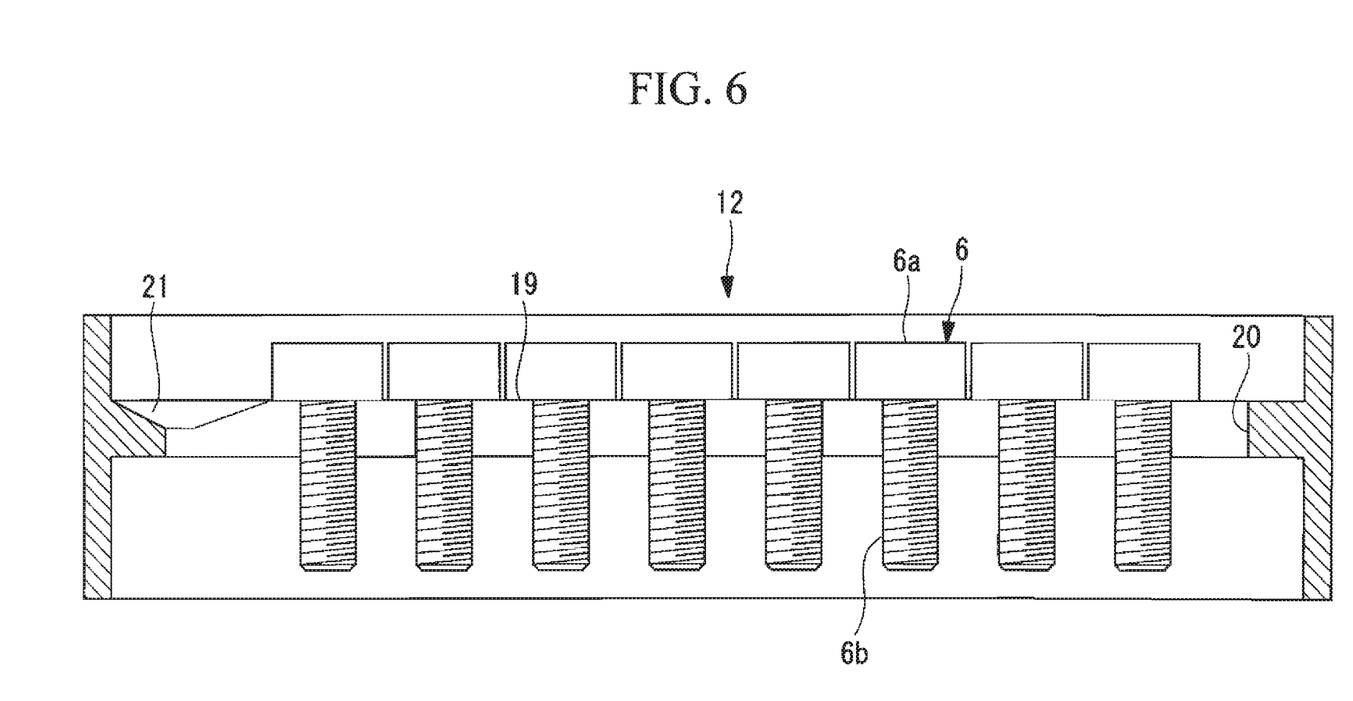
FIG. 6 is a vertical sectional view illustrating a state where a plurality of screws are loaded in the screw magazine in FIG. 4.

As shown in FIGS. 3 to 6, the screw magazine 12 has the shape of a rectangular box and has a flat support surface 19 at a position deeper than the height of the heads 6a of screws 6 accommodated therein. As shown in FIG. 4, the support surface 19 has a slit-like opening 20 that is slightly larger than the outer diameter of an underhead section 6b of each accommodated screw 6 and that has a width smaller than the outer diameter of the head 6a of each screw 6. As shown in FIG. 6, the opening 20 has a length with which a plurality of screws 6 can be accommodated and arranged parallel to each other in a single row.

Thus, as shown in FIG. 6, by disposing the support surface 19 in a substantially horizontal position, inserting the underhead sections 6b into the opening 20, and bringing the bearing surfaces of the heads 6a into contact with the support surface 19, the screws 6 can be supported in a hanging state by the support surface 19.

Figure 7:
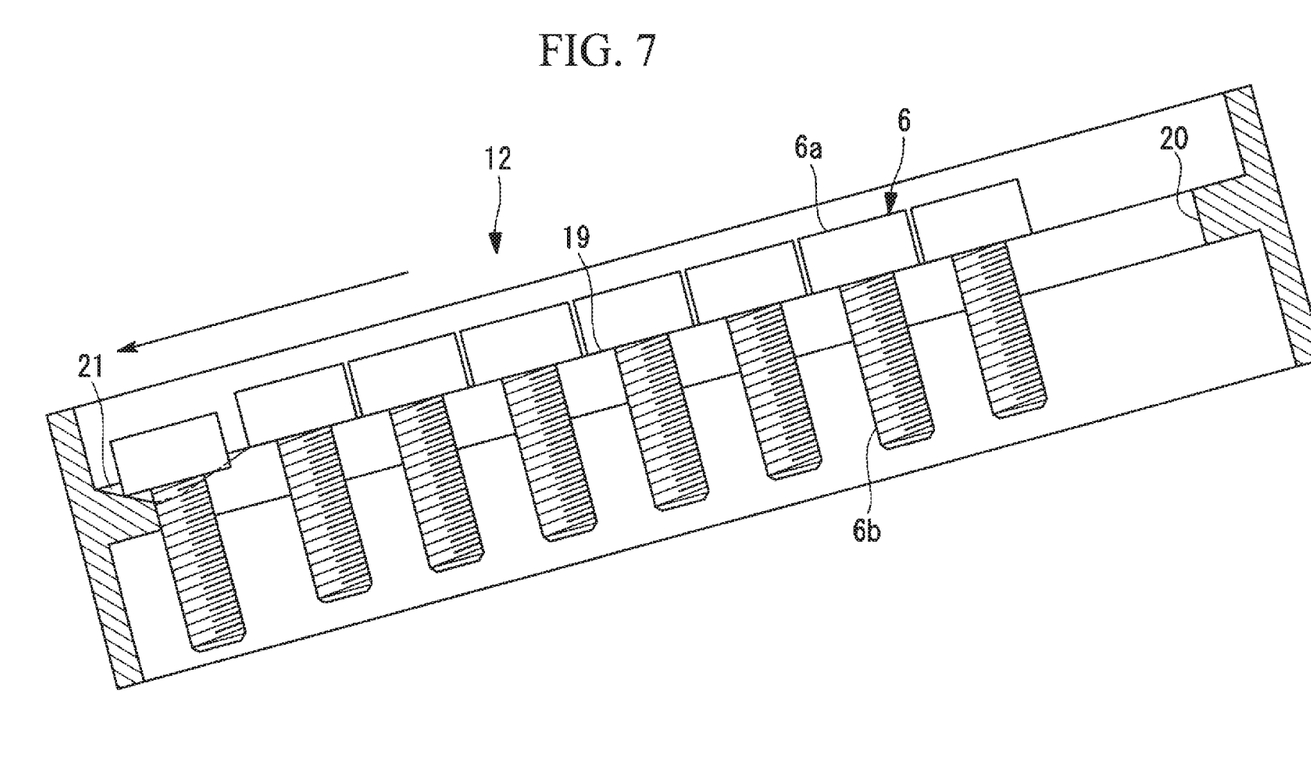
FIG. 7 is a vertical sectional view illustrating a screw retrieving state in which the screw magazine in FIG. 4 is tilted such that a recess is disposed at the lower side.

Furthermore, one lengthwise end of the opening 20 is provided with a bowl-shaped recess 21 that tapers in the depth direction. As shown in FIG. 7, when a screw 6 is disposed in the bowl-shaped recess 21, the screw 6 is stably supported in a state where it is positioned at the center of the recess 21 along the sloped surface of the recess 21.

Figure 8:
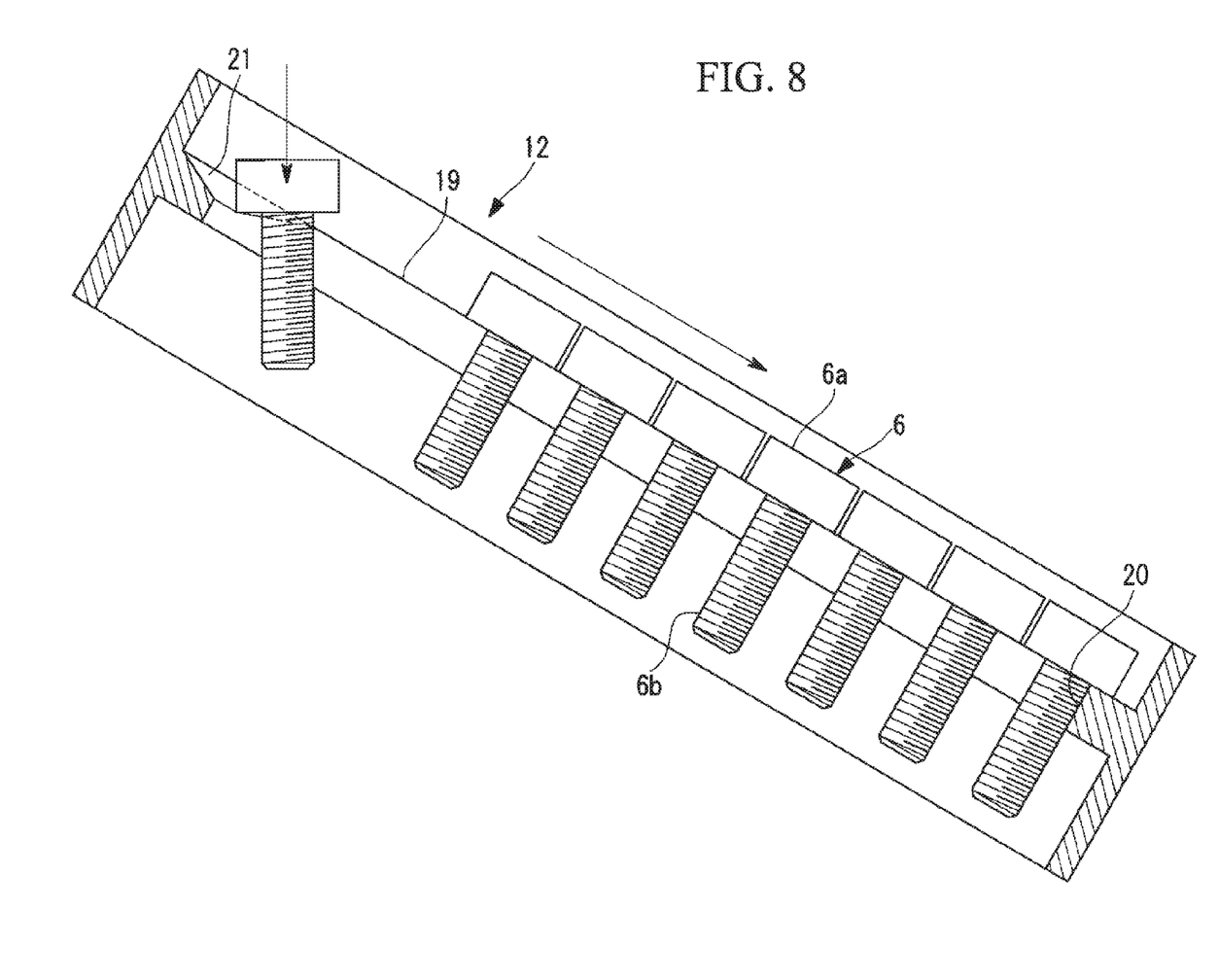
FIG. 8 is a vertical sectional view illustrating a screw loading state in which the screw magazine in FIG. 4 is tilted such that the recess is disposed at the upper side.

Furthermore, as shown in FIGS. 7 and 8, with regard to the screws 6 supported in the hanging state by the support surface 19, the bearing surfaces thereof in contact with the support surface 19 can be slid downward by tilting the support surface 19, thereby causing the screws 6 to descend.

For example, as shown in FIG. 7, by tilting the support surface 19 such that the bowl-shaped recess 21 is disposed at the lower side, the screws 6 supported in the hanging state by the support surface 19 are slid downward toward the recess 21 so as to be fed to the recess 21. In contrast, by tilting the support surface 19 such that the recess 21 is disposed at the upper side, as shown in FIG. 8, a screw 6 fed to the recess 21 can be slid downward away from the recess 21 so as to be loaded into the screw magazine 12.

The magazine moving mechanism 11 includes a first air cylinder 23 that causes a movable member 22 to move relative to the bracket 9 in the axial direction of the nut runner 10, and also includes a second air cylinder 24 that causes the screw magazine 12 to move relative to the movable member 22 in the direction orthogonal to the axial direction of the nut runner 10.

By activating the second air cylinder 24 so as to cause the screw magazine 12 to move in the direction orthogonal to the axial direction of the nut runner 10, the bowl-shaped recess 21 is disposed at a position aligned with the nut-runner suction unit 13, as shown in FIG. 3, so that retrieving and loading processes of the screws 6 can be performed using the nut runner 10. Furthermore, as shown in FIG. 2, the second air cylinder 24 is activated so as to cause the screw magazine 12 to recede from the axis of the nut runner 10, thereby facilitating the screw fastening process using the nut runner 10.

Moreover, by activating the first air cylinder 23, the distance between the screw magazine 12 and the nut-runner suction unit 13 can be increased or decreased. When attaching a screw 6 from the screw magazine 12 to the nut-runner suction unit 13, the screw magazine 12 is moved toward the nut-runner suction unit 13. After the screw 6 is retrieved from the screw magazine 12, the screw magazine 12 is moved away from the nut-runner suction unit 13, so that the loaded screw 6 is retrieved.

In the drawings, reference sign 25 denotes a cover that covers the upper surface of the receded screw magazine 12 and that prevents the screws 6 from falling out from the screw magazine 12 when being moved by the robot 2.

The operation of the robot screw-fastening device 4 and the screw-fastening robot system 1 according to this embodiment having the above-described configuration will now be described.

Figure 9:
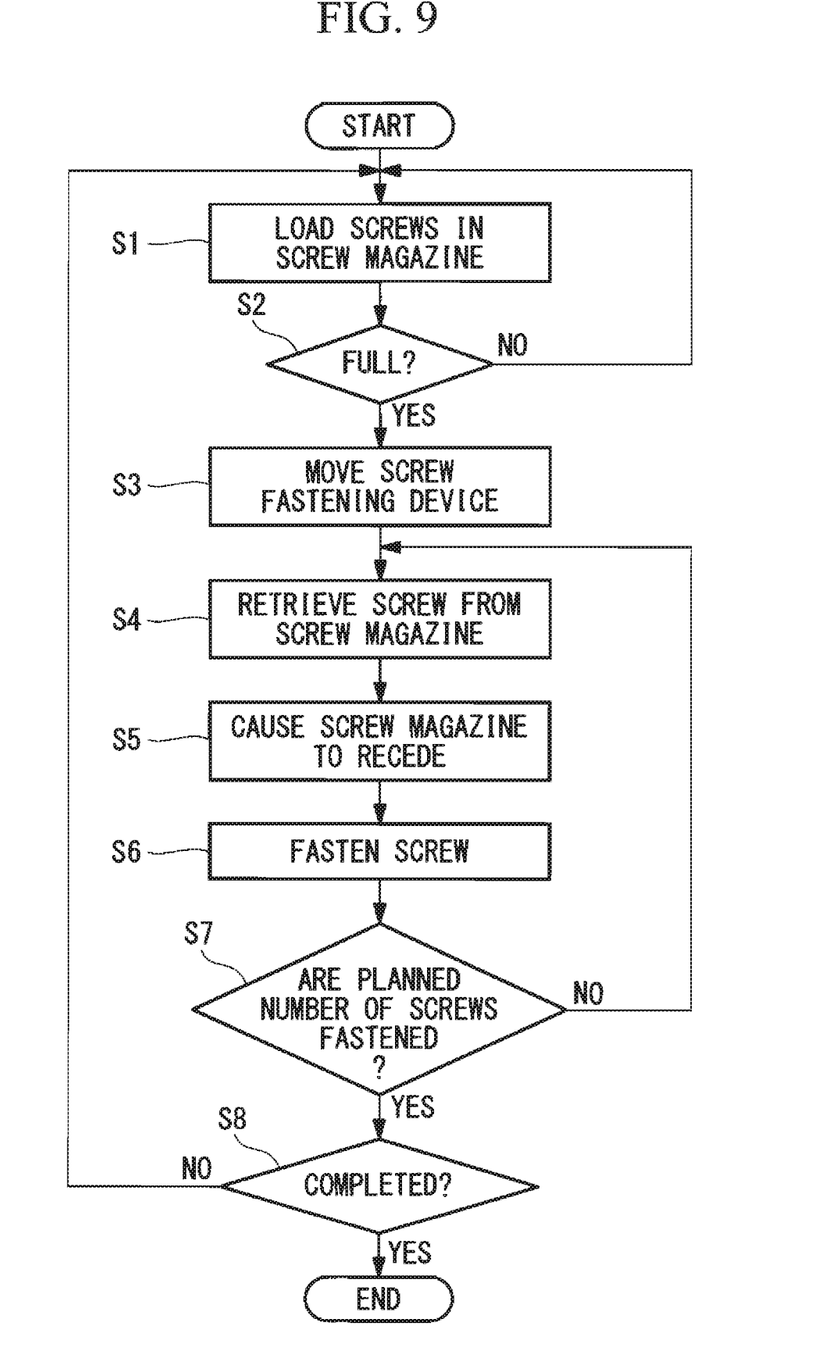
FIG. 9 is a flowchart illustrating a screw fastening method using the screw-fastening robot system in FIG. 1.

As shown in FIG. 9, in order to fasten a screw 6 to an object to be fastened by using the screw-fastening robot system 1 according to this embodiment, screws 6 are loaded into the screw magazine 12 from an externally-disposed screw feeder (not shown) (step S1), as shown in FIG. 8.

The loading process of the screws 6 from the screw feeder to the screw magazine 12 involves feeding screws 6 to the bowl-shaped recess 21 from the screw feeder and operating the robot 2 to tilt the screw magazine 12 so that the recess 21 is disposed at the upper side, thereby causing the fed screws 6 to move deep into the screw magazine 12 along the support surface 19.

Then, it is determined whether or not the screw magazine 12 is full (step S2). If not full, the process from step S1 is repeated.

When the screw magazine 12 becomes full, the nut runner 10 of the robot screw-fastening device 4 is moved to the position above the object to be fastened (step S3), and one of the screws 6 is retrieved from the screw magazine 12 to the nut-runner suction unit 13 (step S4).

The retrieving process from the screw magazine 12 involves tilting the screw magazine 12 by operating the robot 2 such that the recess 21 is disposed at the lower side, whereby one of the screws 6 is disposed in a positioned state in the recess 21. Subsequently, the recess 21 is disposed on the axis of the nut runner 10 by using the second air cylinder 24, the recess 21 is then brought closer to the nut-runner suction unit 13 by using the first air cylinder 23, and the screw 6 positioned in the recess 21 is retrieved by using the nut-runner suction unit 13.

After the screw 6 is retrieved, the screw magazine 12 is moved away from the nut-runner suction unit 13 by using the first air cylinder 23, and the screw magazine 12 is caused to recede from the axis of the nut runner 10 by using the second air cylinder 24 (step S5). Then, the nut runner 10 that has retrieved the screw 6 is used to fasten the screw 6 to the object to be fastened (step S6).

It is determined whether or not a planned number of screws 6 have been fastened (step S7). If the planned number is not reached, the process from step S4 is repeated. If the planned number of screws 6 have been fastened, it is determined whether or not the process is completed (step S8). If the process is not completed, the process from step S1 is repeated.

Accordingly, the robot screw-fastening device 4 and the screw-fastening robot system 1 according to this embodiment are advantageous in that, when using the robot 2 to fasten a screw 6 while changing the position and orientation of the nut runner 10, the screw fastening process can be performed successively for the number of screws 6 loaded in the screw magazine 12 and can also be performed at a plurality of locations while suppressing an increase in cycle time.

Furthermore, because the screw magazine 12 has the bowl-shaped recess 21 at the screw retrieving position for stabilizing the orientation of a screw 6 supported in a hanging state, the orientation of the screw 6 supported in the hanging state and disposed at the screw retrieving position by being slid on the support surface 19 is stably supported by the bowl-shaped recess 21, so as to be reliably retrieved by the nut runner 10.

Furthermore, because the magazine moving mechanism 11 moves the screw magazine 12 in the axial direction of the nut runner 10 and in the direction intersecting the axial direction, the screw retrieving position of the screw magazine 12 can be readily inserted to and extracted from the position below the nut runner 10. Moreover, a screw 6 supported at the screw retrieving position can be moved toward the nut runner 10, thereby facilitating the process for attaching the screw 6 to the nut runner 10.

Furthermore, by using the controller 5 to control the robot 2 having the robot screw-fastening device 4 attached to the distal end of the arm 3, the support surface 19 of the screw magazine 12 provided in the robot screw-fastening device 4 can be tilted, so that the bearing surface of a screw 6 can be caused to slide on the support surface 19, whereby the screw 6 can be disposed at the screw retrieving position or the screw 6 can be loaded in the screw magazine 12.

As a result, the above-described embodiment leads to the following aspects.

An aspect of the present invention provides a robot screw-fastening device including a nut runner that is attached to a distal end of an arm of a robot and that fastens screws one by one, a screw magazine that accommodates a plurality of the screws to be fed to the nut runner, and a magazine inserting-extracting mechanism that inserts and extracts a screw retrieving position of the screw magazine to and from below the nut runner. The screw magazine includes a flat support surface that has a slit-like opening and that comes into contact with a bearing surface of each of the screws so as to support the screws in a hanging state. The slit-like opening allows an underhead section of each screw to extend therethrough in a state where the plurality of screws are arranged parallel to each other in a single row.

According to this aspect, when the plurality of screws are accommodated in the screw magazine, the underhead section of each screw extends through the slit-like opening in the support surface provided in the screw magazine, and the bearing surface of each screw comes into contact with the support surface, whereby the screws are supported in a hanging state by the support surface. In this state, the plurality of screws are disposed parallel to each other within the same opening.

In a case where a screw is to be fed to the nut runner attached to the distal end of the arm of the robot, the support surface is tilted such that the screw retrieving position is set to the lowest position. This causes the bearing surfaces of all of the screws accommodated in the opening to slide downward on the support surface, thus causing the bottommost screw to be disposed at the screw retrieving position. By operating the magazine inserting-extracting mechanism in this state to set the screw retrieving position of the magazine below the nut runner, the nut runner can retrieve the screw at the screw retrieving position. Then, by operating the magazine inserting-extracting mechanism to cause the magazine to recede from below the nut runner, a screw fastening process can be performed using the nut runner having the nut attached thereto.

When using the robot to fasten the screw while changing the position and orientation of the nut runner, the screw fastening process can be performed successively for the number of screws loaded in the screw magazine and can also be performed at a plurality of locations while suppressing an increase in cycle time.

In the above aspect, the screw magazine may have a bowl-shaped recess at the screw retrieving position. The bowl-shaped recess stabilizes orientation of each of the screws supported in the hanging state.

Accordingly, the orientation of a screw supported in the hanging state and disposed at the screw retrieving position by being slid on the support surface is stably supported by the bowl-shaped recess, so as to be reliably retrieved by the nut runner.

In the above aspect, the magazine inserting-extracting mechanism may move the screw magazine in an axial direction of the nut runner and in a direction intersecting the axial direction.

Accordingly, by operating the magazine inserting-extracting mechanism to move the screw magazine in the direction intersecting the axial direction of the nut runner, the screw retrieving position of the screw magazine can be readily inserted to and extracted from the position below the nut runner. Moreover, by using the magazine inserting-extracting mechanism to move the screw magazine in the axial direction of the nut runner in a state where the screw retrieving position is inserted below the nut runner, a screw supported at the screw retrieving position can be moved closer to the nut runner, thereby facilitating the process for attaching the screw to the nut runner.

Another aspect of the present invention provides a screw-fastening robot system including a robot, the aforementioned robot screw-fastening device that is attached to the distal end of the arm of the robot, and a controller that controls the robot and the robot screw-fastening device.

According to this aspect, by using the controller to control the robot having the robot screw-fastening device attached to the distal end of the arm, the support surface of the screw magazine provided in the robot screw-fastening device can be tilted, so that the bearing surface of a screw can be caused to slide on the support surface, whereby the screw can be disposed at the screw retrieving position or the screw can be loaded in the screw magazine.

In the above aspect, when each of the screws is to be fed from the screw magazine to the nut runner, the controller may control the robot to tilt the screw magazine such that the support surface descends toward the screw retrieving position.

Accordingly, by simply operating the robot to tilt the support surface of the screw magazine, the plurality of screws supported by the support surface can be moved toward the screw retrieving position, thereby facilitating the retrieving process by the nut runner.

In the above aspect, when each of the screws is to be loaded in the screw magazine, the controller may control the robot to tilt the screw magazine such that the support surface ascends toward the screw retrieving position.

Accordingly, by simply operating the robot to tilt the support surface of the screw magazine, a screw loaded at the screw retrieving position is moved away from the screw retrieving position along the slit in the support surface, thereby facilitating the process for loading the screw into the screw magazine.

The present invention is advantageous in that a screw fastening process can be performed at a plurality of locations while suppressing an increase in cycle time.

The invention claimed is:

1. A screw-fastening device robot system, comprising:
   a robot having an arm;
   a robot screw-fastening device including:
     a nut runner attached to a distal end of the arm to fasten screws one by one;
     a screw magazine accommodating a plurality of the screws to be fed to the nut runner; and
     a magazine inserting-extracting mechanism that inserts and extracts a screw retrieving position of the screw magazine to and from a location below the nut runner; and
     a controller controlling the robot and the robot screw-fastening device,
   wherein the screw magazine includes a flat support surface with a slit-like opening to contact a bearing surface of each of the screws to support the screws in a hanging state, the slit-like opening allowing an underhead section of each screw to extend therethrough so that the plurality of screws are arranged parallel to each other in a single row,
   wherein, when each of the screws is loaded in the screw magazine the controller controls the robot to tilt the screw magazine such that the support surface ascends toward the screw retrieving position; and wherein, when each of the screws is fed from the screw magazine to the nut runner, the controller controls the robot to tilt the screw magazine such that the support surface descends toward the screw retrieving position.

2. The screw-fastening system according to claim 1, wherein the screw magazine has a bowl-shaped recess at the screw retrieving position, the bowl-shaped recess stabilizing orientation of each of the screws supported in the hanging state.

3. The screw-fastening system according to claim 1, wherein the magazine inserting-extracting mechanism moves the screw magazine in an axial direction of the nut runner and in a direction intersecting the axial direction.

\* \* \* \* \*